(12) United States Patent
Hattori et al.

(10) Patent No.: US 11,174,335 B2
(45) Date of Patent: *Nov. 16, 2021

(54) SILICONE-MODIFIED POLYURETHANE FIBER AND METHOD FOR MANUFACTURING SAME

(71) Applicants: SHIN-ETSU CHEMICAL CO., LTD., Tokyo (JP); DAINICHISEIKA COLOR & CHEMICALS MFG. CO., LTD., Tokyo (JP); SHINSHU UNIVERSITY, NATIONAL UNIVERSITY CORPORATION, Matsumoto (JP)

(72) Inventors: Hatsuhiko Hattori, Annaka (JP); Masaki Tanaka, Tokyo (JP); Hiromasa Sato, Tokyo (JP); Shota Iino, Tokyo (JP); Motoaki Umezu, Tokyo (JP); Toshihisa Tanaka, Ueda (JP); Mikihisa Kondo, Ueda (JP)

(73) Assignees: SHIN-ETSU CHEMICAL CO., LTD., Tokyo (JP); DAINCHISEIK COLOR & CHEMICALS MFG. CO., LTD., Tokyo (JP); SHINSHU UNIVERSITY, NATIONAL UNIVERSITY CORPORATION, Matsumoto (JP)

( * ) Notice: Subject to any disclaimer, the term of this patent is extended or adjusted under 35 U.S.C. 154(b) by 65 days.

This patent is subject to a terminal disclaimer.

(21) Appl. No.: 16/091,024

(22) PCT Filed: Mar. 31, 2017

(86) PCT No.: PCT/JP2017/013658
§ 371 (c)(1),
(2) Date: Oct. 3, 2018

(87) PCT Pub. No.: WO2017/175680
PCT Pub. Date: Oct. 12, 2017

(65) Prior Publication Data
US 2019/0071534 A1    Mar. 7, 2019

(30) Foreign Application Priority Data

Apr. 4, 2016  (JP) .............................. JP2016-075002

(51) Int. Cl.
*C08G 18/61* (2006.01)
*D04H 1/4358* (2012.01)
(Continued)

(52) U.S. Cl.
CPC ......... *C08G 18/61* (2013.01); *C08G 18/1816* (2013.01); *C08G 18/1883* (2013.01);
(Continued)

(58) Field of Classification Search
None
See application file for complete search history.

(56) References Cited

U.S. PATENT DOCUMENTS

| 4,043,331 A | 8/1977 | Martin et al. |
| 4,839,443 A * | 6/1989 | Akutsu ............ C08G 18/3893 525/474 |

(Continued)

FOREIGN PATENT DOCUMENTS

| CN | 102712736 A | 10/2012 |
| EP | 2 495 270 A1 | 9/2012 |

(Continued)

OTHER PUBLICATIONS

International Search Report for PCT/JP2017/013658 (PCT/ISA/210) dated May 16, 2017.
(Continued)

*Primary Examiner* — Jennifer A Steele
(74) *Attorney, Agent, or Firm* — Birch, Stewart, Kolasch & Birch, LLP

(57) ABSTRACT

Disclosed herein is a fiber formed from a resin including a silicone-modified polyurethane resin comprising the reac-
(Continued)

tion products of a polyol (A), a chain extender (B), an active-hydrogen-group-containing organopolysiloxane (C), and a polyisocyanate (D), wherein the active-hydrogen-group-containing organopolysiloxane (C) contains an active-hydrogen-group-containing organopolysiloxane (C-1) having a carbinol group at only one terminal.

12 Claims, 2 Drawing Sheets

(51) Int. Cl.

| | |
|---|---|
| D04H 1/728 | (2012.01) |
| D01F 6/70 | (2006.01) |
| C08G 18/65 | (2006.01) |
| C08G 18/18 | (2006.01) |
| C08G 18/32 | (2006.01) |
| C08G 18/40 | (2006.01) |
| C08G 18/48 | (2006.01) |
| C08G 18/66 | (2006.01) |
| C08G 18/75 | (2006.01) |
| C08G 18/76 | (2006.01) |
| D01D 5/00 | (2006.01) |

(52) U.S. Cl.
CPC ..... *C08G 18/3206* (2013.01); *C08G 18/4009* (2013.01); *C08G 18/4854* (2013.01); *C08G 18/65* (2013.01); *C08G 18/6674* (2013.01); *C08G 18/755* (2013.01); *C08G 18/7671* (2013.01); *D01D 5/003* (2013.01); *D01F 6/70* (2013.01); *D04H 1/4358* (2013.01); *D04H 1/728* (2013.01)

(56) References Cited

U.S. PATENT DOCUMENTS

| 6,637,181 | B1 | 10/2003 | Korte et al. |
| 7,765,647 | B2 | 8/2010 | Smith et al. |
| 2003/0209835 | A1 | 11/2003 | Chun et al. |
| 2010/0317249 | A1 | 12/2010 | Clark et al. |

FOREIGN PATENT DOCUMENTS

| JP | 3007681 B | * | 2/1991 | | |
| JP | 2001-207334 A | | 8/2001 | | |
| JP | 2002-517616 A | | 6/2002 | | |
| JP | 2006-501373 A | | 1/2006 | | |
| JP | 2008-223186 A | | 9/2008 | | |
| JP | 2010-189771 A | | 9/2010 | | |
| JP | 2011-503387 A | | 1/2011 | | |
| JP | 2011-173936 A | | 9/2011 | | |
| JP | 2011173936 | * | 9/2011 | ............... | D01F 6/70 |
| JP | 2014-025157 A | | 2/2014 | | |
| JP | 2014-111850 A | | 6/2014 | | |
| KR | 10-2010-0069652 A | | 8/2010 | | |
| WO | WO-2008088730 A2 | * | 7/2008 | ........... | D01D 5/0038 |
| WO | WO 2009/067230 A1 | | 5/2009 | | |
| WO | WO 2016/158967 A1 | | 10/2016 | | |

OTHER PUBLICATIONS

Written Opinion of the International Searching Authority for PCT/JP2017/013658 (PCT/ISA/237) dated May 16, 2017.

Extended European Search Report, dated Nov. 21, 2019, for European Application No. 17779059.9.

Chinese First Office Action and Search Report (including an English translation thereof) issued in the corresponding Chinese Patent Application No. 201780021070.7 dated Nov. 6, 2020.

\* cited by examiner

SILICONE-MODIFIED POLYURETHANE FIBER AND METHOD FOR MANUFACTURING SAME

TECHNICAL FIELD

This invention relates to a fiber formed from a resin containing a silicone-modified polyurethane resin and a method for preparing the same.

BACKGROUND ART

In general, most resin fibers are obtained by a dry spinning method while resin fibers of certain type are obtained by a melt spinning method, wet spinning method or the like. Electrospinning methods (e.g., electrostatic spinning, electrospinning, and melt electrospinning methods) are known as methods for preparing a fibrous structure having a small fiber diameter (see Patent Documents 1 to 3, for example). The electrospinning method is a fiber spinning method which is capable of yielding an extra-fine fibrous structure and non-woven fabric in one stage by applying a high voltage between the nozzle tip of the syringe filled with a polymer-containing solution or a polymer melt and the collector substrate, dividing the polymer into an extra-fine size by electrostatic repulsion, and simultaneously collecting the polymer. Typically, the fibrous structure is formed via curing while the solvent is evaporated off from the polymer solution during the fiber spinning step. Curing may be performed by cooling (e.g., when the sample is liquid at high temperature), chemical curing (e.g., treating with curing vapor) or evaporating the solvent (e.g., when the sample is liquid at room temperature). The non-woven fabric is collected on a structure which is suitably disposed, and may be detached therefrom if necessary.

Nanofibers of a polyurethane resin have heretofore been disclosed (Patent Documents 4 and 5). There are left problems such as low slippage, low flexibility, and poor blocking resistance, and in a certain application, insufficient water repellency. Nanofibers of a silicone resin (Patent Document 6) and silsesquioxane (Patent Document 7) have also been disclosed. Fibers of such three-dimensional, high density crosslinked silicone resins suffer from a lack of flexibility and poor workability.

PRIOR ART DOCUMENTS

Patent Documents

Patent Document 1: JP-A 2008-223186
Patent Document 2: JP-A 2010-189771
Patent Document 3: JP-A 2014-111850
Patent Document 4: U.S. Pat. No. 4,043,331
Patent Document 5: JP-A 2006-501373
Patent Document 6: JP-A 2011-503387
Patent Document 7: JP-A 2014-025157

SUMMARY OF INVENTION

Technical Problem

An object of the present invention is to provide a fiber having excellent properties including flexibility, slippage, blocking resistance, heat retention, water vapor permeability, water repellency, and spinnability and a method for preparing the same.

Solution to Problem

Making extensive investigations to solve the above problems, the inventors have found that the problems can be overcome by a silicone-modified polyurethane-based fiber and a method for preparing the fiber, as described below.

The present invention provides a fiber and a preparation method as defined below.

[1]
A fiber formed from a resin comprising a silicone-modified polyurethane resin comprising the reaction product of a polyol (A), a chain extender (B), an active hydrogen-containing organopolysiloxane (C), and a polyisocyanate (D), the active hydrogen-containing organopolysiloxane (C) containing an active hydrogen-containing organopolysiloxane (C-1) having a carbinol group only at one end.

[2]
The fiber of [1] wherein the active hydrogen-containing organopolysiloxane (C-1) having a carbinol group is an organopolysiloxane having the following formula (1):

$$R^1R^2R^3SiO(SiR^2R^3O)_nSiR^2R^3R^4 \tag{1}$$

wherein $R^1$, $R^2$ and $R^3$ are each independently selected from a straight, branched or cyclic $C_1$-$C_{10}$ alkyl group in which some hydrogen may be substituted by fluorine, optionally substituted $C_5$-$C_{12}$ aryl group, and vinyl group, $R^4$ is represented by the following formula (2):

$$-R^5-X-CH_2CR^6(R^7)_2 \tag{2}$$

wherein $R^5$ is a $C_2$-$C_{10}$ divalent alkylene group which may contain an oxygen atom in the chain, $R^6$ is hydrogen, amino or $C_1$-$C_{10}$ monovalent alkyl group, $R^7$ is a $C_1$-$C_{10}$ carbinol group, and X is a single bond or —O— bond, and n is an integer of 1 to 200.

[3]
The fiber of [2] wherein the carbinol group is selected from hydroxymethyl, 2-hydroxyethan-1-yl, 2-hydroxypropan-1-yl, 3-hydroxypropan-1-yl, 2-hydroxybutan-1-yl, 4-hydroxybutan-1-yl, 5-hydroxypentan-1-yl, 6-hydroxyhexan-1-yl, 7-hydroxyheptan-1-yl, 8-hydroxyoctan-1-yl, 9-hydroxynonan-1-yl, and 10-hydroxydecan-1-yl.

[4]
The fiber of any one of [1] to [3] wherein component (C) further contains an organopolysiloxane (C-2) having the following formula (3):

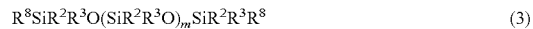

$$R^8SiR^2R^3O(SiR^2R^3O)_mSiR^2R^3R^8 \tag{3}$$

wherein $R^2$ and $R^3$ are as defined above, $R^8$ is each independently a $C_1$-$C_{10}$ monovalent hydrocarbon which has a hydroxyl or mercapto group and may have an oxygen atom intervening in the chain, or a $C_1$-$C_{10}$ monovalent hydrocarbon group having a primary or secondary amino group, and m is an integer of 1 to 60.

[5]
The fiber of [4] wherein a ratio of the organopolysiloxane (C-1) having formula (1) to the organopolysiloxane (C-2) having formula (3), that is, (C-1):(C-2) is from 100:0 to 1:99 as a weight ratio.

[6]
The fiber of any one of [1] to [5] wherein component (C) is present in an amount of 0.1 to 50 parts by weight per 100 parts by weight of components (A) to (D) combined.

[7]
The fiber of any one of [1] to [6] wherein the silicone-modified polyurethane resin has a number average molecular weight of 10,000 to 200,000.

[8]

The fiber of any one of [1] to [7] which has a fiber diameter of 100 nm to less than 1,000 nm.

[9]

A fiber layup structure comprising the fiber of any one of [1] to [8].

[10]

A method for preparing the fiber of any one of [1] to [8], comprising the step of spinning a fiber from a solution or dispersion of the silicone-modified polyurethane resin by an electrospinning method.

[11]

The method for preparing the fiber according to [10] wherein the silicone-modified polyurethane resin is fed in the form of a solution or dispersion in an organic solvent, water or a mixture thereof.

Advantageous Effects of Invention

The invention is successful in providing fibers having excellent properties including flexibility, slippage, blocking resistance, heat retention, water vapor permeability, water repellency, and spinnability.

DESCRIPTION OF EMBODIMENTS

Figure 1:
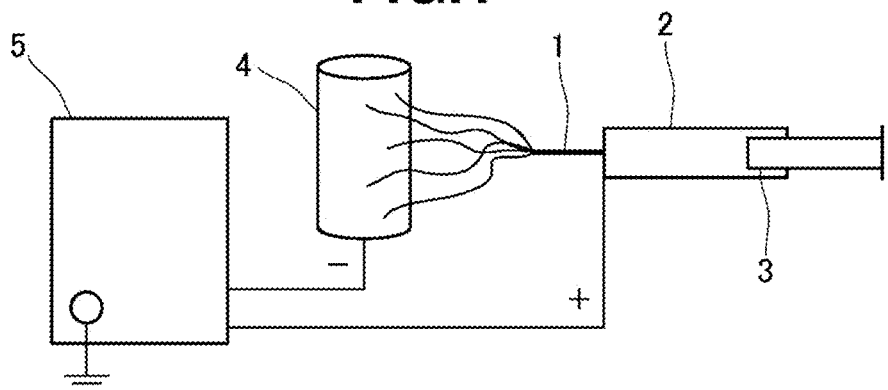
FIG. 1 is a schematic view for illustrating one exemplary apparatus in which a non-woven fabric is prepared by injecting a polymer solution in an electrostatic field using an electrospinning (i.e., electrostatic spinning) method.

Now the invention is described in detail.

The fiber of the invention is characterized in that it is formed from a resin containing a silicone-modified polyurethane resin.

The silicone-modified polyurethane resin is obtained from reaction of a polyol (A), a chain extender (B), an active hydrogen-containing organopolysiloxane (C), and a polyisocyanate (D) and preferably contains the active hydrogen-containing organopolysiloxane (C) in an amount of 0.1 to 50 parts, more preferably 0.1 to 40 parts, and even more preferably 1 to 30 parts by weight per 100 parts by weight of components (A) to (D) combined.

As used herein, the term "reaction product" refers to not only a reaction product consisting of components (A) to (D), but also a reaction product including components (A) to (D) and another component such as a polyamine (E).

In the invention, the silicone-modified polyurethane resin may be prepared using a well-known polyurethane synthesis method. For example, the silicone-modified polyurethane resin may be obtained from reaction of a polyol (A), a chain extender (B), an active hydrogen-containing organopolysiloxane (C), and a polyisocyanate (D).

The polyol (A) is a high molecular weight polyol having a number average molecular weight of at least 500, preferably 500 to 10,000, and more preferably 700 to 3,000, excluding the active hydrogen-containing organopolysiloxane (C). Examples of the high molecular weight polyol include those belonging to groups (i) to (vi) described below. It is noted that the number average molecular weight used herein is determined by gel permeation chromatography versus polymethyl methacrylate standards.

(i) Polyether polyols; for example, those obtained from polymerization or copolymerization of an alkylene oxide (e.g., ethylene oxide, propylene oxide or butylene oxide) and/or a heterocyclic ether (e.g., tetrahydrofuran), such as polyethylene glycol, polypropylene glycol, polyethylene glycol-polytetramethylene glycol (block or random), polytetramethylene ether glycol, and polyhexamethylene glycol (ii) Polyester polyols; for example, those obtained from condensation polymerization of an aliphatic dicarboxylic acid (e.g., succinic acid, adipic acid, sebacic acid, glutaric acid or azelaic acid) and/or an aromatic dicarboxylic acid (e.g., isophthalic acid or terephthalic acid) with a low-molecular-weight glycol (e.g., ethylene glycol, 1,2-propylene glycol, 1,3-propylene glycol, 1,4-butylene glycol, 1,6-hexamethylene glycol, neopentyl glycol or 1,4-bishydroxymethylcyclohexane), such as poly(ethylene adipate) diol, poly(butylene adipate) diol, poly(hexamethylene adipate) diol, poly(neopentyl adipate) diol, poly(ethylene/butylene adipate) diol, poly(neopentyl/hexyl adipate) diol, poly(3-methylpentane adipate) diol, and poly(butylene isophthalate) diol (iii) Polylactone polyols; for example, polycaprolactone diol or triol and poly-3-methylvalerolactone diol (iv) Polycarbonate polyols; for example, polycarbonate polyols such as poly(trimethylene carbonate) diol, poly(tetramethylene carbonate) diol, poly(pentamethylene carbonate) diol, poly(neopentyl carbonate) diol, poly(hexamethylene carbonate) diol, poly(1,4-cyclohexanedimethylene carbonate) diol, poly(decamethylene carbonate) diol, and random/block copolymers thereof (v) Polyolefin polyols; for example, polybutadiene glycol, polyisoprene glycol, and hydrides thereof (vi) Polymethacrylate polyols; for example, α,ω-polymethyl methacrylate diol and α,ω-polybutyl methacrylate diol Of these, polyether polyols are preferred, with polyethylene glycol, polypropylene glycol and polytetramethylene ether glycol being more preferred.

The chain extender (B) is a short chain polyol having a number average molecular weight of less than 500, preferably 60 to less than 500, and more preferably 75 to 300, examples of which include aliphatic glycols such as ethylene glycol, 1,2-propanediol, 1,3-propanediol, 1,4-butanediol, 1,3-butanediol, 1,6-hexamethylene glycol, and neopentyl glycol, and alkylene oxide low mole adducts thereof (number average molecular weight of less than 500); alicyclic glycols such as 1,4-bishydroxymethylcyclohexane and 2-methyl-1,1-cyclohexanedimethanol, and alkylene oxide low mole adducts thereof (number average molecular weight of less than 500); aromatic glycols such as xylylene glycol, and alkylene oxide low mole adducts thereof (number average molecular weight of less than 500); bisphenols such as bisphenol A, thiobisphenol, and sulfonebisphenol, and alkylene oxide low mole adducts thereof (number average molecular weight of less than 500); alkyldialkanol amines such as $C_1$-$C_{18}$ alkyldiethanol amines; and polyhydric alcohol compounds such as glycerol, trimethylolethane, trimethylolpropane, pentaerythritol, tris(2-hydroxyethyl)isocyanurate, 1,1,1-trimethylolethane, and 1,1,1-trimethylolpropane. Of these, aliphatic glycols are preferred, with ethylene glycol, 1,3-propanediol and 1,4-butanediol being more preferred.

The chain extender (B) is preferably used in an amount of 1 to 200 parts, more preferably 10 to 30 parts by weight per 100 parts by weight of the polyol (A).

The active hydrogen-containing organopolysiloxane (C) should contain an organopolysiloxane (C-1) having a carbinol group only at one end, represented by the formula (1).

$$R^1R^2R^3SiO(SiR^2R^3O)_nSiR^2R^3R^4 \quad (1)$$

In formula (1), $R^1$, $R^2$ and $R^3$ are each independently selected from a straight, branched or cyclic $C_1$-$C_{10}$ alkyl group in which some hydrogen may be substituted by fluorine, optionally substituted $C_5$-$C_{12}$ aryl group, and vinyl group, $R^4$ is represented by the following formula (2):

$$-R^5-X-CH_2CR^6(R^7)_2 \quad (2)$$

wherein $R^5$ is a $C_2$-$C_{10}$ divalent alkylene group which may contain an oxygen atom in the chain, $R^6$ is hydrogen, amino or $C_1$-$C_{10}$ monovalent alkyl group, IC is a $C_1$-$C_{10}$ carbinol group, and X is a single bond or —O— bond, and n is an integer of 1 to 200.

In formula (1), $R^1$, $R^2$ and $R^3$ are each independently selected from a straight, branched or cyclic $C_1$-$C_{10}$ alkyl group in which some hydrogen may be substituted by fluorine, optionally substituted $C_5$-$C_{12}$ aryl group, and vinyl group.

Examples of the straight, branched or cyclic $C_1$-$C_{10}$ alkyl group include methyl, ethyl, propyl, isopropyl, n-butyl, cyclohexyl, 2-ethylhexan-1-yl, 2-phenylethan-1-yl, and 2-methyl-2-phenylethan-1-yl.

Examples of the straight, branched or cyclic $C_1$-$C_{10}$ alkyl group in which some hydrogen is substituted by fluorine include 3,3,3-trifluoropropyl, 3,3,4,4,4-pentafluorobutyl, 3,3,4,4,5,5,6,6,6-nonafluorohexyl, 3,3,4,4,5,5,6,6,7,7,7-undecafluoroheptyl, 3,3,4,4,5,5,6,6,7,7,8,8,8-tridecafluorooctyl, 3,3,4,4,5,5,6,6,7,7,8,8,9,9,9-pentadecafluorononyl, and 3,3,4,4,5,5,6,6,7,7,8,8,9,9,10,10,10-heptadecafluorodecyl.

Examples of the optionally substituted $C_5$-$C_{12}$ aryl group include phenyl, 2-methyl-1-phenyl, 3-methyl-1-phenyl, 4-methyl-1-phenyl, 2,3-dimethyl-1-phenyl, 3,4-dimethyl-1-phenyl, 2,3,4-trimethyl-1-phenyl, 2,4,6-trimethyl-1-phenyl, and naphthyl.

Of these, $R^2$ and $R^3$ are preferably methyl, phenyl, 3,3,3-trifluoropropyl or vinyl.

In formula (2) representative of $R^4$, $R^5$ is a $C_2$-$C_{10}$ divalent alkylene group optionally containing an oxygen atom in the chain, which is selected from 1,2-ethylene, 1,2-propylene, 1,3-propylene, 1,3-butylene, 1,4-butylene, 1,3-pentylene, 1,4-pentylene, 1,5-pentylene, 1,6-hexylene, 1,7-heptylene, 1,8-octylene, 1,9-nonylene, 1,10-decylene, 2-(3-propan-1-oxy)ethan-1-ylene, 3-(3-propan-1-oxy)propan-1-ylene, 4-(3-propan-1-oxy)butan-1-ylene, 5-(3-propan-1-oxy)pentan-1-ylene, 6-(3-propan-1-oxy)hexan-1-ylene, 1,3-cyclohexylene, 1,4-cyclohexylene, 1,3-cycloheptylene, 1,4-cycloheptylene, and 1,4-dioxacyclohexan-2,5-ylene. For availability, 1,3-propylene is preferred.

In formula (2), $R^6$ is hydrogen or a $C_1$-$C_{10}$ monovalent alkyl group, examples of which include methyl, ethyl, propyl, isopropyl, n-butyl, cyclohexyl, 2-ethylhexan-1-yl, 2-phenylethan-1-yl, and 2-methyl-2-phenylethan-1-yl. Of these, hydrogen, methyl and ethyl are preferred.

In formula (2), $R^7$ is a $C_1$-$C_{10}$ divalent carbinol group, examples of which include hydroxymethyl, 2-hydroxyethan-1-yl, 2-hydroxypropan-1-yl, 3-hydroxypropan-1-yl, 2-hydroxybutan-1-yl, 4-hydroxybutan-1-yl, 5-hydroxypentan-1-yl, 6-hydroxyhexan-1-yl, 7-hydroxyheptan-1-yl, 8-hydroxyoctan-1-yl, 9-hydroxynonan-1-yl, and 10-hydroxydecan-1-yl. Of these, hydroxymethyl and 2-hydroxyethan-1-yl are preferred.

In formula (2), X is a single bond or —O— bond.

In formula (1), n is an integer of 1 to 200, preferably an integer of 10 to 160.

The organopolysiloxane (C-1) may be synthesized in a way corresponding to a desired substituent. Examples include the following Compounds (1-1) to (1-6). In the following formulae, Me stands for methyl, Ph for phenyl, and Bu for butyl (the same applies hereinafter).

[Chem. 1]

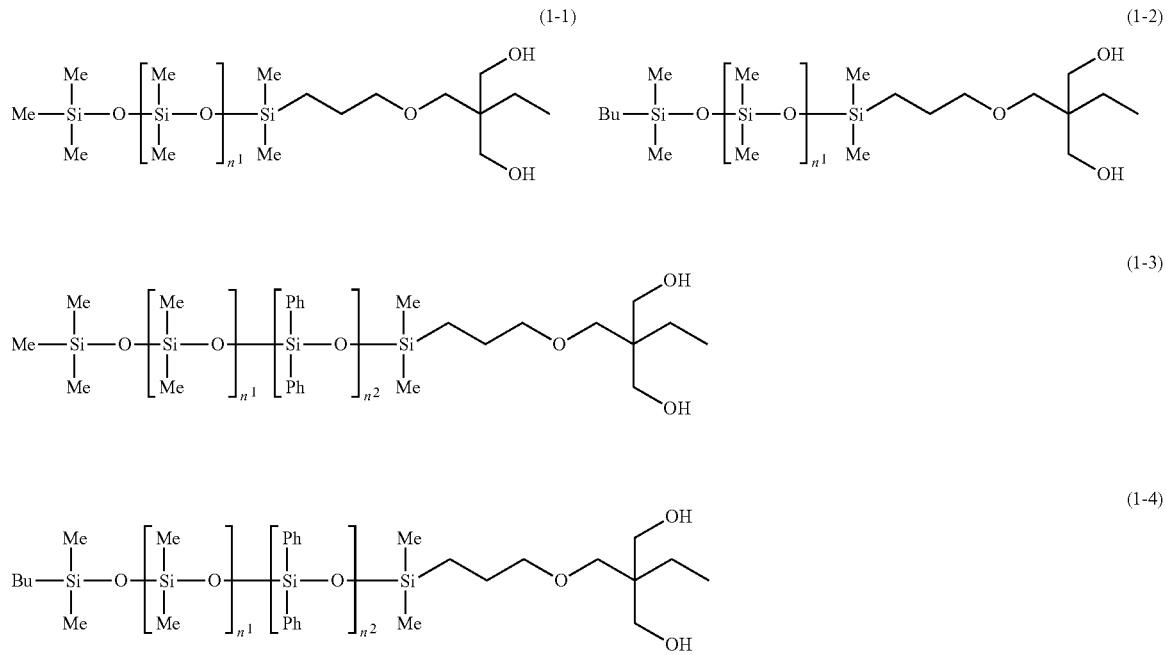

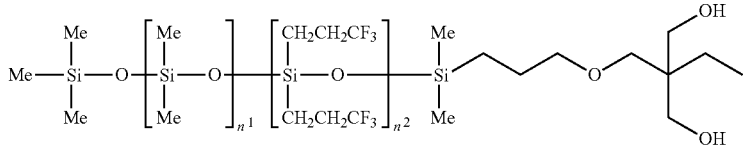

(1-5)

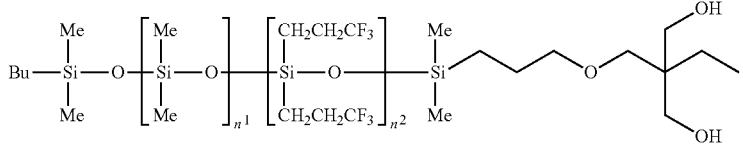

(1-6)

Notably, in Compounds (1-1) and (1-2), $n^1=n$ and $n^1$ is at least 1. In Compounds (1-3) to (1-6), $n^1+n^2=n$, $n^1$ is at least 1, and $n^2$ is also at least 1.

These compounds may be synthesized by effecting hydrosilylation reaction of one end hydrogen polydimethylsiloxane with trimethylolpropane monoallyl ether.

Although the active hydrogen-containing organopolysiloxane (C) may consist of the organopolysiloxane (C-1) having formula (1), it can further contain an active hydrogen-containing organopolysiloxane (C-2) having the following formula (3) in addition to the organopolysiloxane (C-1).

In formula (3), $R^2$ and $R^3$ are as defined above, $R^8$ is each independently a $C_1$-$C_{10}$ monovalent hydrocarbon which has a hydroxyl or mercapto group and may have an oxygen atom intervening in the chain or a $C_1$-$C_{10}$ monovalent hydrocarbon group having a primary or secondary amino group, and m is an integer of 1 to 60.

Examples of the $C_1$-$C_{10}$ monovalent hydrocarbon group which has a hydroxyl or mercapto group and may have an oxygen atom intervening in the chain include hydroxymethyl, 2-hydroxyethan-1-yl, 2-hydroxypropan-1-yl, 3-hydroxypropan-1-yl, 2-hydroxybutan-1-yl, 3-hydroxybutan-1-yl, 4-hydroxybutan-1-yl, 2-hydroxyphenyl, 3-hydroxyphenyl, 4-hydroxyphenyl, 2-(hydroxymethoxy)ethan-1-yl, 2-(2-hydroxyethoxy)ethan-1-yl, 2-(2-hydroxypropoxy)ethan-1-yl, 2-(3-hydroxypropoxy)ethan-1-yl, 2-(2-hydroxybutoxy)ethan-1-yl, 2-(3-hydroxybutoxy)ethan-1-yl, 2-(4-hydroxybutoxy)ethan-1-yl, 3-(hydroxymethoxy)propan-1-yl, 3-(2-hydroxyethoxy)propan-1-yl, 3-(2-hydroxypropoxy)propan-1-yl, 3-(3-hydroxypropoxy)propan-1-yl, 3-(2-hydroxybutoxy)propan-1-yl, 3-(3-hydroxybutoxy)propan-1-yl, 3-(4-hydroxybutoxy)propan-1-yl, mercaptomethyl, 2-mercaptoethan-1-yl, 2-mercaptopropan-1-yl, 3-mercaptopropan-1-yl, 2-mercaptobutan-1-yl, 3-mercaptobutan-1-yl, 4-mercaptobutan-1-yl, 2-(mercaptomethoxy)ethan-1-yl, 2-(2-mercaptoethoxy)ethan-1-yl, 2-(2-mercaptopropoxy)ethan-1-yl, 2-(3-mercaptopropoxy)ethan-1-yl, 2-(2-mercaptobutoxy)ethan-1-yl, 2-(3-mercaptobutoxy)ethan-1-yl, 2-(4-mercaptobutoxy)ethan-1-yl, 3-(mercaptomethoxy)propan-1-yl, 3-(2-mercaptoethoxy)propan-1-yl, 3-(2-mercaptopropoxy)propan-1-yl, 3-(3-mercaptopropoxy)propan-1-yl, 3-(2-mercaptobutoxy)propan-1-yl, 3-(3-mercaptobutoxy)propan-1-yl, and 3-(4-mercaptobutoxy)propan-1-yl.

Examples of the $C_1$-$C_{10}$ monovalent hydrocarbon group having a primary or secondary amino group include aminomethyl, 2-aminoethan-1-yl, 2-aminopropan-1-yl, 3-aminopropan-1-yl, 2-aminobutan-1-yl, 3-aminobutan-1-yl, 4-aminobutan-1-yl, N-methylaminomethyl, N-methyl-2-aminoethan-1-yl, N-methyl-2-aminopropan-1-yl, N-methyl-3-aminopropan-1-yl, N-methyl-2-aminobutan-1-yl, N-methyl-3-aminobutan-1-yl, N-methyl-4-aminobutan-1-yl, N-ethylaminomethyl, N-ethyl-2-aminoethan-1-yl, N-ethyl-2-aminopropan-1-yl, N-ethyl-3-aminopropan-1-yl, N-ethyl-2-aminobutan-1-yl, N-ethyl-3-aminobutan-1-yl, N-ethyl-4-aminobutan-1-yl, N-butylaminomethyl, N-butyl-2-aminoethan-1-yl, N-butyl-2-aminopropan-1-yl, N-butyl-3-aminopropan-1-yl, N-butyl-2-aminobutan-1-yl, N-butyl-3-aminobutan-1-yl, and N-butyl-4-aminobutan-1-yl.

Of these, $R^8$ in formula (3) is preferably a $C_2$-$C_6$ monovalent hydrocarbon group having a primary or secondary hydroxyl group and optionally having an oxygen atom intervening in the chain or a $C_2$-$C_6$ monovalent hydrocarbon group having a primary or secondary amino group, more preferably 2-hydroxyethan-1-yl, 3-hydroxypropan-1-yl, 3-(2-hydroxyethoxy)propan-1-yl or 3-aminopropan-1-yl.

In formula (3), $R^2$ and $R^3$ are as defined above, and preferably methyl, phenyl, 3,3,3-trifluoropropyl or vinyl.

In formula (3), m is an integer of 1 to 60, preferably an integer of 5 to 40.

The organopolysiloxane (C-2) may be synthesized in a way corresponding to a desired substituent or commercially available. Examples include the following Compounds (3-1) and (3-2).

[Chem. 2]

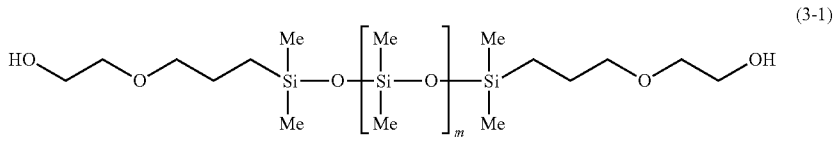

(3-1)

(3-2)

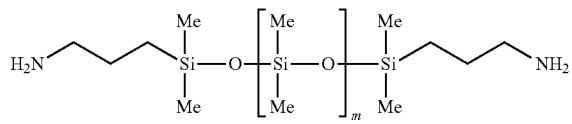

Herein m is as defined above.

While the relative amounts may vary depending on the desired properties, the weight ratio of the organopolysiloxane (C-1) having formula (1) to the organopolysiloxane (C-2) having formula (3) should preferably be from 100:0 to 1:99. When the organopolysiloxane (C-2) is compounded, the ratio is preferably from 99:1 to 1:99.

Notably, the total amount of component (C) used is as defined above.

The polyisocyanate (D) used herein may be any of well-known polyisocyanates. Preferred examples include aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenylene isocyanate) (MDI), durylene diisocyanate, tolidine diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylene diisocyanate, 1,5-tetrahydronaphthalene diisocyanate, isophorone diisocyanate, 4,4'-methylenebis(cyclohexyl isocyanate) (H12MDI), and hydrogenated XDI; and polyurethane prepolymers obtained by reacting these diisocyanate compounds with low-molecular-weight polyols or polyamines so as to terminated with isocyanate.

The polyisocyanate (D) is used in such an amount that the equivalent ratio of isocyanate groups to active hydrogen groups derived from components (A) to (C) may fall in a range of preferably from 0.9 to 1.1, more preferably from 0.95 to 1.05, and even more preferably from 0.99 to 1.01.

A polyamine (E) may be added in the synthesis of the inventive silicone-modified polyurethane resin. Examples of the polyamine (E) include short chain diamines, aliphatic diamines, aromatic diamines, long chain diamines, and hydrazines, excluding the active hydrogen-containing organopolysiloxane (C). Exemplary short chain diamines include aliphatic diamine compounds such as ethylenediamine, trimethylenediamine, hexamethylenediamine, trimethylhexamethylenediamine, and octamethylenediamine, aromatic diamine compounds such as phenylenediamine, 3,3'-dichloro-4,4'-diaminodiphenylmethane, 4,4'-methylenebis(phenylamine), 4,4'-diaminodiphenyl ether, and 4,4'-diaminodiphenyl sulfone, and alicyclic diamine compounds such as cyclopentanediamine, cyclohexyldiamine, 4,4-diaminodicyclohexylmethane, 1,4-diaminocyclohexane, and isophoronediamine. Exemplary long chain diamines include those obtained from polymerization or copolymerization of an alkylene oxide (e.g., ethylene oxide, propylene oxide or butylene oxide), such as polyoxyethylenediamine and polyoxypropylenediamine. Exemplary hydrazines include hydrazine, carbodihydrazide, adipic acid dihydrazide, sebacic acid dihydrazide, and phthalic acid dihydrazide. When amino-modified silane coupling agents are used, it is possible to design self-curing reaction type paints. Examples include N-2-(aminoethyl)-3-aminopropylmethyldimethoxysilane (KBM-602, Shin-Etsu Chemical Co., Ltd), N-2-(aminoethyl)-3-aminopropylmethyltrimethoxysilane (KBM-603, Shin-Etsu Chemical Co., Ltd), N-2-(aminoethyl)-3-aminopropylmethyldiethoxysilane (KBE-602, Shin-Etsu Chemical Co., Ltd), 3-aminopropyltrimethoxysilane (KBE-603, Shin-Etsu Chemical Co., Ltd), 3-aminopropyltriethoxysilane (KBE-903, Shin-Etsu Chemical Co., Ltd), and 3-ureidopropyltriethoxysilane.

When compounded, the polyamine (E) is used in an amount of 1 to 20 parts, more preferably 1 to 15 parts by weight per 100 parts by weight of components (A) to (D) combined.

If necessary, a catalyst may be used in the synthesis of the inventive silicone-modified polyurethane resin. Examples of the catalyst include dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dibutyltin bisisooctylthioglycolate, dibutyltin bis-2-ethylhexylthioglycolate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), the reaction product of dibutyltinoxide with a silicate compound, the reaction product of dibutyltinoxide and phthalate, lead octoate, tetrabutyl titanate, tetrapropyl titanate, tetraisopropyl titanate, titanium tetrakis(acetylacetonate), titanium diisopropoxy bis(acetylacetonate), titanium diisopropoxy bis(ethylacetate), salts of metals with organic or inorganic acids, such as complexes obtained by reaction of titanium chloride or the like with a diol such as tartaric acid, organometal derivatives, and tertiary organic base catalysts such as trimethylamine, triethylamine ($Et_3N$), diisopropylethylamine (DIPEA), tri-n-butylamine, tri-n-pentylamine, tri-n-hexylamine, tri-n-heptylamine, tri-n-octylamine, N-methylpyrrolidine, N-methylpiperidine, N-methylmorpholine (NMO), N,N,N',N'-tetramethylethylenediamine (TMEDA), N-methylimidazole (NMI), pyridine, 2,6-lutidine, 1,3,5-collidine, N,N-dimethylaminopyridine (DMAP), pyrazine, quinoline, 1,8-diazabicyclo[5,4,0]-7-undecene (DBU), and 1,4-diazabicyclo[2,2,2]octane (DABCO).

The catalyst is used in a catalytic amount, preferably 0.01 to 10 mol %, more preferably 0.1 to 5 mol % based on the total amount of components (A) to (E).

The silicone-modified polyurethane resin may be synthesized in a solventless system or in an organic solvent if necessary. Suitable organic solvents include solvents which are inert to isocyanate groups or have lower activity than reactants. Examples include ketone solvents, e.g., acetone, methyl ethyl ketone, methyl isobutyl ketone, cyclohexanone, and menthone; aromatic hydrocarbon solvents, e.g., toluene, o-xylene, m-xylene, p-xylene, 1,3,5-mesitylene, 1,2,3-mesitylene, 1,2,4-mesitylene, ethylbenzene, n-propylbenzene, i-propylbenzene, n-butylbenzene, i-butylbenzene, sec-butylbenzene, t-butylbenzene, n-pentylbenzene, i-pentylbenzene, sec-pentylbenzene, t-pentylbenzene, n-hexylbenzene, i-hexylbenzene, sec-hexylbenzene, t-hexylbenzene, Swazole (aromatic hydrocarbon solvent from Cosmo Oil Co., Ltd.), and Solvesso (aromatic hydrocarbon solvent from Exxon Chemical Co., Ltd.); aliphatic hydrocarbon solvents, e.g., pentane, hexane, heptane, octane, nonane, cyclopentane, cyclohexane, cycloheptane, cyclooctane, methylcyclohexane, ethylcyclohexane, propylcyclohexane, n-butylcyclohexane, i-butylcyclohexane, sec-butylcyclohexane, t-butylcyclohexane, n-pentylcyclohexane, i-pentylcyclohexane, sec-pentylcyclohexane, t-pentylcyclohexane, n-hexylcyclohexane, i-hexylcyclohexane, sec-hexylcyclohexane, t-hexylcyclohexane, and limonene; alcohol solvents, e.g., methyl alcohol, ethyl alcohol, isopropyl alcohol, s-butyl alcohol, iso-butyl alcohol, and t-butyl alcohol; ether solvents, e.g., diethyl ether, t-butyl methyl ether (TBME), dibutyl ether, cyclopentyl methyl ether (CPME), diphenyl ether, dimethoxymethane (DMM), tetrahydrofuran (THF), 2-methyltetrahydrofuran, 2-ethyltetrahydrofuran, tetrahydropyran (THP), dioxane, trioxane, 1,2-dimethoxyethane, diethylene glycol dimethyl ether, and diethylene glycol diethyl ether; ester solvents, e.g., ethyl acetate, butyl acetate, and isobutyl acetate; glycol ether ester solvents, e.g., ethylene glycol ethyl ether acetate, propylene glycol methyl ether acetate, 3-methyl-3-methoxybutyl acetate, and ethyl 3-ethoxypropionate; amide solvents, e.g., dimethylformamide (DMF), dimethylacetamido (DMAc), N-methyl-2-pyrrolidone (NMP), 1,3-dimethyl-2-imidazolidinone (DMI), and 1,3-dimethyl-3,4,5,6-tetrahydro-2(1H)-pyrimidinone (DMPU); and nitrile solvents, e.g., acetonitrile, propionitrile, butyronitrile, and benzonitrile. Of these, DMF, methyl ethyl ketone, ethyl acetate, acetone and tetrahydrofuran are preferred in consideration of solvent recovery, and solubility, reactivity, boiling point, and emulsifying or dispersing ability in water during urethane synthesis.

In the step of synthesizing the inventive silicone-modified polyurethane resin, when some isocyanate groups are left at polymer ends, termination reaction to the isocyanate end may further be performed. For example, not only monofunctional compounds such as monoalcohols and monoamines, but also compounds having two functional groups which have different reactivity to the isocyanate group may be used. Examples include monoalcohols such as methyl alcohol, ethyl alcohol, n-propyl alcohol, isopropyl alcohol, n-butyl alcohol, isobutyl alcohol, and t-butyl alcohol; monoamines such as monoethylamine, n-propylamine, diethylamine, di-n-propylamine, and di-n-butylamine; and alkanolamines such as monoethanolamine and diethnolamine. Of these, alkanolamines are preferred for ease of reaction control.

The silicone-modified polyurethane resin preferably has a number average molecular weight (Mn) of 10,000 to 200,000. As long as the Mn of the silicone-modified polyurethane resin falls within the range, polymer chains are fully entangled together in the polymer solution to facilitate fibrillization. Also from the standpoint of the polymer solution developing an adequate viscosity for fiber spinning by an electrospinning method, the Mn should preferably fall within the above range. More preferably the Mn is 40,000 to 120,000.

In the invention, various additives such as inorganic or organic fillers may be compounded for the purpose of improving a variety of properties of the resulting fiber. When used, preferably additives such as fillers are previously added in a predetermined amount to a reaction system for the synthesis of a silicone-modified polyurethane resin, and so a non-woven fabric having the additives uniformly dispersed therein is obtained.

Also another resin may be mixed with the resin to form a resin composition as long as the benefits of the invention are not impaired. Furthermore, additives such as nucleating agents, carbon black, pigments including fired inorganic pigments, antioxidants, stabilizers, plasticizers, lubricants, parting agents and flame retardants may be added to impart the desired properties as long as the benefits of the invention are not impaired.

The fiber of the invention is formed from a resin containing the silicone-modified polyurethane resin. Although the resin preferably consists of the silicone-modified polyurethane resin, it may contain one or more resins such as vinyl resins, acrylic resins, methacrylic resins, epoxy resins, urethane resins, olefin resins, and silicone resins in an amount of preferably 0 to 50% by weight, more preferably 0 to 20% by weight, if necessary.

As used herein, the term "fiber layup structure" refers to a three-dimensional structure which is formed by laying up, weaving, knitting or otherwise processing one or multiple fibers. Exemplary forms of the fiber layup structure include non-woven fabric, tube, and mesh.

The non-woven fabric according to the invention preferably has an elastic modulus of 1 to 20 MPa, more preferably 2 to 10 MPa, a coefficient of dynamic friction on its surface of 0.5 to 2.0, more preferably 0.5 tp 1.0, a thermal conductivity of 0.001 to 0.02 W/mK, more preferably 0.01 to 0.02 W/mK, a contact angle with water of at least 100° (i.e., water repellent), more preferably 120 to 160°, a moisture regain of up to 150%, more preferably 50 to 120%, and an elongation at break of at least 80%, more preferably at least 100%.

The fiber comprising the inventive silicone-modified polyurethane resin is preferably produced through the following three steps. The first step is to produce the silicone-modified polyurethane resin, the second step is to prepare a solution or dispersion of the silicone-modified polyurethane resin using an organic solvent, water or a mixture thereof, and the third step is to spin a fiber from the solution or dispersion of the silicone-modified polyurethane resin.

The first step of producing the silicone-modified polyurethane resin is, for example, by combining a polyol (A), a chain extender (B), an active hydrogen-containing organopolysiloxane (C), and a polyisocyanate (D) in such amounts that the equivalent ratio of isocyanate groups to active hydrogen groups may range from 0.9/1 to 1.1/1, reacting them in the presence or absence of an organic solvent free of an active hydrogen group in the molecule typically at 20 to 150° C., preferably 50 to 110° C. in accordance with a one-shot process or multi-stage process, emulsifying the resulting resin with water and a neutralizing agent, and removing the solvent if necessary, thereby yielding the silicone-modified polyurethane resin (or emulsion thereof in water).

In the second step, a solution or dispersion of a resin containing the silicone-modified polyurethane resin is prepared using an organic solvent, water or mixture thereof. The solution or dispersion preferably has a solid concentration of 10 to 50% by weight. If the solid concentration is less than 10% by weight, fiber formation is difficult and the product undesirably becomes particulate or bead-like. If the solid concentration is more than 50% by weight, the resulting fibers have a larger fiber diameter, and the solution has a higher viscosity so that the fiber spinning apparatus is likely to undergo liquid delivery failure and nozzle clogging. More preferably the solid concentration is 20 to 40% by weight.

The solvent used in the second step is not particularly limited as long as it has a boiling point of up to 300° C. at 1 atm., is liquid at 25° C., and dissolves the silicone-modified polyurethane resin and an optional resin. For example, the solvent used for polymerization of the silicone-modified polyurethane resin may be used, and the silicone-modified polyurethane resin solution obtained from polymerization may be used as such. Examples of the other solvent include organic solvents such as ether compounds, alcohol compounds, ketone compounds, amide compounds, nitrile compounds, aliphatic hydrocarbons, and aromatic hydrocarbons, typically dimethylformamide and methyl ethyl ketone, and water or mixtures thereof.

Examples of the ether compound include diethyl ether, t-butyl methyl ether (TBME), dibutyl ether, cyclopentyl methyl ether (CPME), diphenyl ether, dimethoxymethane (DMM), tetrahydrofuran (THF), 2-methyltetrahydrofuran, 2-ethyltetrahydrofuran, tetrahydropyran (THP), dioxane, trioxane, 1,2-dimethoxyethane, diethylene glycol dimethyl ether, and diethylene glycol diethyl ether, with THF being preferred. Examples of the alcohol compound include methanol, ethanol, 1-propanol, 2-propanol, n-butyl alcohol, i-butyl alcohol, s-butyl alcohol, t-butyl alcohol, ethylene glycol, 2-methoxyethanol, 2-(2-methoxyethoxy)ethanol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerol, 2-ethyl-2-mercaptomethyl-1,3-propanediol, 1,2,6-hexanetriol, cyclopentanol, cyclohexanol, and phenol, with methanol, ethanol and ethylene glycol being preferred. Examples of the ketone compound include methyl ethyl ketone, methyl isobutyl ketone, cyclopentanone, cyclohexanone, acetone, and limonene, with methyl ethyl ketone being preferred. Examples of the amide compound include dimethylformamide (DMF), diethylformamide, dimethylacetamide (DMAc), N-methylpyrrolidone (NMP), N-ethylpyrrolidone, 1,3-dimethyl-2-imidazolidinone (DMI), and 1,3-dimethyl-3,4,5,6-tetrahydro-2 (1H)-pyrimidinone (DMPU), with dimethylformamide being preferred. Examples of the nitrile compound include acetonitrile, propionitrile, butyronitrile, and benzonitrile, with acetonitrile and propionitrile being preferred. Examples of the aliphatic and aromatic hydrocarbons include toluene, o-xylene, m-xylene, p-xylene, 1,3,5-mesitylene, 1,2,3-mesitylene, 1,2,4-mesitylene, ethylbenzene, n-propylbenzene, i-propylbenzene, n-butylbenzene, i-butylbenzene, sec-butylbenzene, t-butylbenzene, n-pentylbenzene, i-pentylbenzene, sec-pentylbenzene, t-pentylbenzene, n-hexylbenzene, i-hexylbenzene, sec-hexylbenzene, t-hexylbenzene, cyclopentane, cyclohexane, cycloheptane, cyclooctane, methylcyclohexane, ethylcyclohexane, propylcyclohexane, n-butylcyclohexane, i-butylcyclohexane, sec-butylcyclohexane, t-butylcyclohexane, n-pentylcyclohexane, i-pentylcyclohexane, sec-pentylcyclohexane, t-pentylcyclohexane, n-hexylcyclohexane, i-hexylcyclohexane, sec-hexylcyclohexane, t-hexylcyclohexane, limonene, and α,α,α-trifluoromethylbenzene.

The solvent mixture is preferably a combination of an ether compound with water, an ether compound with an alcohol compound, a ketone compound with water, or an amide compound with a ketone compound. A solvent mixture of an amide compound and a ketone compound is more preferred. The mixing ratio of the amide compound to the ketone compound is preferably from 50:50 to 80:20 (both in weight ratio) because the use of a low-boiling ketone compound increases the evaporating rate and makes fiber spinning difficult.

The solution or dispersion of the resin containing the silicone-modified polyurethane resin preferably has a viscosity of 1 to 1,500 dPa·s, more preferably 200 to 800 dPa·s. Notably, the viscosity is measured at 25° C. by a rotational viscometer.

The third step is to spin fibers from the solution or dispersion of the silicone-modified polyurethane resin. Although the fiber spinning method is not particularly limited, electrospinning methods (e.g., electrostatic spinning, electrospinning, and melt spinning methods) are preferred.

In the electrospinning method, a non-woven fabric is obtained by injecting a polymer solution in an electrostatic field which is generated by applying a high voltage between electrodes on a nozzle and a collector, to form fibers and laying up the fibers on a collecting substrate. As used herein, the term "non-woven fabric" refers not only to one after evaporating and removing the solvent, but also to one containing the solvent.

Described below is a fiber spinning apparatus suitable for the electrospinning method preferably used in the invention. The electrodes used herein may be any electrodes of metal, inorganic or organic substances as long as they are electrically conductive. Also, insulating materials having a thin film of a conductive metal, inorganic or organic substance thereon may be used. The electrostatic field is established by applying a high voltage between a nozzle and a target and may be established between a pair of or a multiplicity of electrodes. For example, the use of three electrodes, in total, consisting of two electrodes having different voltage values (e.g., 15 kV and 10 kV) and a grounded electrode and the use of more electrodes are encompassed.

In preparing fibers by the electrospinning method, the solvent may be used alone or in a combination of two or more. Examples of the method for controlling the evaporating rate of the solvent include adjusting the nozzle shape, using a solvent mixture, and adjusting the temperature or humidity in the fiber spinning environment, which may be used in a suitable combination. Of these, using a solvent mixture is a simple and effective solution.

The polymer solution may be discharged from a nozzle into the electrostatic field by any methods. For example, in FIG. 1, a polymer solution 2 is fed to a polymer solution reservoir equipped with a nozzle 1 and the polymer solution is ejected from the polymer reservoir nozzle set in the electrostatic field, to whip into fibers. Any suitable apparatus may be used for the process. For example, a syringe needle-shaped nozzle 1 is attached at the tip of a polymer solution-containing portion of a cylindrical syringe 3 and placed at an adequate distance from a collecting substrate 4 having a grounded electrode while a voltage is applied to the nozzle 1 by any suitable means such as a high-voltage supply 5. As the polymer solution 2 is ejected from the tip of the nozzle 1, it whips into fibers between the tip of the nozzle 1 and the collecting substrate 4.

In addition to the above method, well-known methods may be used for introducing the polymer solution into the electrostatic field. For example, an electrode which is paired with the electrode for collecting a fibrous structure may be directly inserted into a polymer solution-containing syringe having a nozzle. A tank may be used instead of the syringe because often the syringe is of a small volume. While applying pressure from the top of the tank, fiber spinning may be carried out from a nozzle located at the bottom of the tank. Inversely, while applying pressure from the bottom of the tank, fiber spinning may be carried out from a nozzle located at the top of the tank. In this case, an electrode may be placed near a blowing opening instead of directly attaching to the nozzle and assisting air may be used for laying up fibers on the collecting substrate (JP-A 2010-121221). As another fiber spinning method not using a nozzle, electrostatic spinning on a rotating roller is proposed. For example, the rotating roller is immersed in the bath filled with the polymer solution, the polymer solution is carried on the roller surface, and a high voltage is applied to the roller surface to perform electrostatic spinning.

When the polymer solution is fed from a nozzle into the electrostatic field, the production rate of a fibrous structure may be increased by providing multiple nozzles (JP-A 2007-303031) or an assisting air blower (JP-A 2014-47440). For the purpose of improving the quality, nanofiber alignment may be improved by providing an electrode body between a nozzle and a collecting substrate to impart a preselected electric potential (JP-A 2008-223186); multiple nozzles may be provided with an assisting air blowing opening and the spacing between the nozzles be controlled (JP-A 2014-177728); and gear pumps may be used to deliver a mixed solution to multiple nozzles for ensuring a constant fiber diameter and accelerating a processing speed (JP-A 2010-189771). Although the distance between electrodes depends on the voltage, the nozzle size (i.e., diameter), the flow rate and concentration of the fiber spinning solution, and the like, for example, a distance of 5 to 30 cm is adequate at an applied voltage of 10 to 20 kV for preventing a corona discharge as well. Another method for preventing a corona discharge may be fiber spinning in vacuum.

The applied voltage is preferably 3 to 100 kV, though not limited thereto. If the applied voltage is less than 3 kV, there is an undesirable tendency that fiber formation is difficult because of weak Coulomb repulsion. If it exceeds 100 kV, sparks may undesirably generate between the electrodes, interfering with fiber spinning. More preferably the voltage is 5 to 30 kV.

Although the size of the nozzle through which the polymer solution is ejected is not particularly limited, it is preferably 0.05 to 2 mm, more preferably 0.1 to 1 mm in consideration of a balance between productivity and the resulting fiber diameter.

The feed rate (or extrusion speed) of the polymer solution is not particularly limited. It is preferably determined as appropriate because it affects the target fiber diameter.

If the feed rate is too high, the desired fiber may not be obtained due to insufficient evaporation of the solvent, short Coulomb repulsion, and other impacts. Too low a feed rate undesirably reduces the productivity of fibers. The feed rate of the polymer solution is preferably 0.01 to 0.1 ml/min per nozzle.

While the collecting substrate also serves as an electrode in the above embodiment, fibers may be collected on a collecting substrate placed between electrodes. In this embodiment, continuous production becomes possible by placing a belt-shaped collecting substrate between electrodes.

When the polymer solution is deposited on the collecting substrate, the solvent evaporates and a fibrous structure is formed. Generally, the solvent evaporates off at room temperature before capture on the collecting substrate. If the solvent evaporates insufficiently, fiber spinning may be performed under vacuum conditions. The temperature of the fiber spinning environment varies with a particular solvent and depends on the evaporation of the solvent and the viscosity of the polymer solution. The fiber spinning is typically performed at 0 to 50° C. When a low volatile solvent is used, a temperature of higher than 50° C. may be employed as long as the functions of the fiber spinning apparatus and the resulting fiber layup structure are not impaired. An adequate humidity is 0 to 50% RH, although it may be changed depending on the polymer concentration, the type of solvent and the like. To this end, the syringe or tank for feeding the polymer solution may be equipped with a temperature control mechanism and a humidity control mechanism.

The fibers of the invention may be used alone or in combination with another member, depending on ease of handling and other requirements. For example, a support base such as a non-woven fabric, woven fabric or film is used as the collecting substrate and the fibers are laid thereon. Then a composite material of the support base combined with the fiber layup structure can be prepared.

The fibers or fiber layup structure of the invention may find use in a variety of applications such as filters, apparel, and biocompatible materials.

Examples of the filter application include air filters as components of HEPA and ULPA filters, gas permeable membranes, gas separation membranes, battery separators which must be microporous, and polymer electrolyte membranes for fuel cells.

Examples of the apparel application include protectors for directly covering a mouth or nose such as neck warmers and face masks, which are capable of eliminating the discomfort of stuffy humidity due to breath. Other examples include sport wears capable of quickly releasing sweat, and fabrics taking advantage of the heat-retaining ability due to low thermal conductivity, such as materials used for climbing wears, winter inner wears, and outer wear linings.

Examples of the biocompatible material application include medical tubes such as catheters and artificial blood vessels, scratch-covering materials such as wound pads, gauze, culture media for regenerative medical engineering.

Other applications include polishing pads of glass and metal silicon; makeup tools such as puffs; cleaning cloth for stain or dirt removal; surface members of artificial leathers; and sheet materials which enable encapsulation and sustained release of food additives or ingredients by using water-soluble nanofibers.

EXAMPLES

Examples and Comparative Example are given below for illustrating the invention, but the invention is not limited thereto. In Examples and Comparative Example, "parts" and "%" are by weight, unless otherwise stated. Evaluation in Examples and Comparative Example was conducted by the following method.

In Examples, the number average molecular weight (Mn) is measured by gel permeation chromatography (GPC) versus polymethyl methacrylate (PMMA) standards. The GPC measurement was conducted under conditions: instrument HLC-8320GPC (Tosoh Corp.), solvent tetrahydrofuran (THF), and resin concentration 0.1%.

Synthesis of Silicone Graft-Modified Polyurethane Resin

Synthesis Example 1: Synthesis of SiPU1

A reactor equipped with a stirrer, reflux condenser, thermometer, nitrogen inlet tube and opening was furnished.

While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 50 g of a one end-type silicone diol (Compound (1-1) of formulae (1) and (2), n=10), and 686.4 g of dimethylformamide (DMF). Heating and stirring was started and continued until the system became uniform, after which 169.6 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 61.0 g of DMF and 320.3 g of methyl ethyl ketone (MEK) were added, yielding a solution of silicone polyurethane resin SiPU1 having a silicone content of 10.9%, a number average molecular weight (Mn) of 71,000, and a solid content of 30%. The results are shown in Table 1.

Synthesis Example 2: Synthesis of SiPU2

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 48 g of a one end-type silicone diol (Compound (1-1) of formulae (1) and (2), n=25), and 669.0 g of dimethylformamide (DMF). Heating and stirring was started and continued until the system became uniform, after which 160.6 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 59.5 g of DMF and 312.6 g of methyl ethyl ketone (MEK) were added, yielding a solution of silicone polyurethane resin SiPU2 having a silicone content of 10.7%, a number average molecular weight of 70,000, and a solid content of 30%. The results are shown in Table 1.

Synthesis Example 3: Synthesis of SiPU3

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 0.5 g of a one end-type silicone diol (Compound (1-1) of formulae (1) and (2), n=30), and 591.8 g of dimethylformamide (DMF). Heating and stirring was started and continued until the system became uniform, after which 156.0 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 52.6 g of DMF and 276.1 g of methyl ethyl ketone (MEK) were added, yielding a solution of silicone polyurethane resin SiPU3 having a silicone content of 0.13%, a number average molecular weight of 76,000, and a solid content of 30%. The results are shown in Table 1.

Synthesis Example 4: Synthesis of SiPU4

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 4.5 g of a one end-type silicone diol (Compound (1-1) of formulae (1) and (2), n=30), and 598.2 g of dimethylformamide (DMF). Heating and stirring was started and continued until the system became uniform, after which 156.3 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 53.2 g of DMF and 279.2 g of methyl ethyl ketone (MEK) were added, yielding a solution of silicone polyurethane resin SiPU4 having a silicone content of 1.1%, a number average molecular weight of 75,000, and a solid content of 30%. The results are shown in Table 1.

Synthesis Example 5: Synthesis of SiPU5

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 48 g of a one end-type silicone diol (Compound (1-1) of formulae (1) and (2), n=30), and 668.6 g of dimethylformamide (DMF). Heating and stirring was started and continued until the system became uniform, after which 159.7 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 59.4 g of DMF and 312.0 g of methyl ethyl ketone (MEK) were added, yielding a solution of silicone polyurethane resin SiPU5 having a silicone content of 10.8%, a number average molecular weight of 72,000, and a solid content of 30%. The results are shown in Table 1.

Synthesis Example 6: Synthesis of SiPU6

A reactor equipped with a stirrer, reflux condenser, thermometer, nitrogen inlet tube and opening was furnished. While the reactor interior was purged with nitrogen gas, the reactor was charged with 22.5 g of polytetramethylene glycol (trade name PolyTHF 1000 by BASF Japan, Ltd., Mn 1,000, hydroxyl value 113 mg KOH/g), 38 g of 1,4-butanediol, 177.5 g of a one end-type silicone diol (compound (1-1) of formulae (1) and (2), n=30), and 544.7 g of dimethylformamide (DMF). Heating and stirring was started and continued until the system became uniform, after which 125.1 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 48.4 g of DMF and 254.2 g of methyl ethyl ketone (MEK) were added, yielding a solution of silicone polyurethane resin SiPU6 having a silicone content of 48.9%, a number average molecular weight of 70,000, and a solid content of 30%. The results are shown in Table 1.

Synthesis Example 7: Synthesis of SiPU7

A reactor equipped with a stirrer, reflux condenser, thermometer, nitrogen inlet tube and opening was furnished.

While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 47 g of a one end-type silicone diol (Compound (1-1) of formulae (1) and (2), n=120), and 662.9 g of dimethylformamide (DMF). Heating and stirring was started and continued until the system became uniform, after which 156.9 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 58.9 g of DMF and 309.3 g of methyl ethyl ketone (MEK) were added, yielding a solution of silicone polyurethane resin SiPU7 having a silicone content of 10.6%, a number average molecular weight of 78,000, and a solid content of 30%. The results are shown in Table 1.

Synthesis Example 8: Synthesis of SiPU8

A reactor equipped with a stirrer, reflux condenser, thermometer, nitrogen inlet tube and opening was furnished. While the reactor interior was purged with nitrogen gas, the reactor was charged with 150 g of polytetramethylene glycol (trade name PolyTHF 1000 by BASF Japan, Ltd., Mn 1,000, hydroxyl value 113 mg KOH/g), 38 g of 1,4-butanediol, 50 g of a one end-type silicone diol (Compound (1-1) of formulae (1) and (2), n=30), and 186.0 g of dimethylformamide (DMF). Heating and stirring was started and continued until the system became uniform, after which 196.1 g of isophorone diisocyanate (IPDI) (a ratio of isocyanate to hydroxyl=1.5) was added thereto at 50° C. The temperature was raised at 100° C. for reaction. The reaction was continued until the NCO % reached the predetermined value (3.99%), after which 943.8 g of DMF was added, and the temperature was set at 40° C. To the system, 50.1 g of isophorone diamine (IPDA) was added. The reaction was conducted until the absorption peak at 2,270 cm$^{-1}$ assigned to a free isocyanate group on infrared absorption spectroscopy analysis disappeared. There was obtained a solution of silicone polyurethane resin SiPU8 having a silicone content of 10.3%, a number average molecular weight of 80,000, and a solid content of 30%. The results are shown in Table 1.

Synthesis of Silicone Graft/Block-Modified Polyurethane Resin

Synthesis Example 9: Synthesis of SiPU9

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, 24 g of a one end-type silicone diol (Compound (1-1) of formulae (1) and (2), n=30), 24 g of a dual end-type silicone diol (Compound (3-1), m=30), and 670.7 g of dimethylformamide (DMF). Heating and stirring was started and continued until the system became uniform, after which 161.1 g of 4,4'-methylenebis(phenylene isocyanate) (MDI) was added thereto at 50° C. The temperature was raised at 80° C. for reaction. The reaction was conducted until the absorption peak at 2,270 cm$^{-1}$ assigned to a free isocyanate group on infrared absorption spectroscopy analysis disappeared. Thereafter, 59.6 g of DMF and 313.0 g of methyl ethyl ketone (MEK) were added, yielding a solution of silicone polyurethane resin SiPU9 having a silicone content of 10.7%, a number average molecular weight of 78,000, and a solid content of 30%. The results are shown in Table 1.

Synthesis Example 10: Synthesis of SiPU10

A reactor equipped with a stirrer, reflux condenser, thermometer, nitrogen inlet tube and opening was furnished. While the reactor interior was purged with nitrogen gas, the reactor was charged with 150 g of polytetramethylene glycol (trade name PolyTHF 1000 by BASF Japan, Ltd., Mn 1,000, hydroxyl value 113 mg KOH/g), 38 g of 1,4-butanediol, 24 g of a one end-type silicone diol (Compound (1-1) of formulae (1) and (2), n=30), and 173.7 g of dimethylformamide (DMF). Heating and stirring was started and continued until the system became uniform, after which 193.4 g of isophorone diisocyanate (IPDI) (a ratio of isocyanate to hydroxyl=1.5) was added thereto at 50° C. The temperature was raised at 100° C. for reaction. The reaction was continued until the NCO % reached the predetermined value (4.21%), after which 937.4 g of DMF was added, and the temperature was set at 40° C. To the system, 24 g of a dual end-type silicone diamine (Compound (3-2), m=20) was added and then 46.8 g of isophorone diamine (IPDA) added. The reaction was conducted until the absorption peak at 2,270 cm$^{-1}$ assigned to a free isocyanate group on infrared absorption spectroscopy analysis disappeared, yielding a solution of silicone polyurethane resin SiPU10 having a silicone content of 10.1%, a number average molecular weight of 81,000, and a solid content of 30%. The results are shown in Table 1.

Synthesis of Silicone-Free Polyurethane Resin

Comparative Synthesis Example 1: Synthesis of PU1

A reactor equipped with a stirrer, reflux condenser, thermometer, nitrogen inlet tube and opening was furnished. While the reactor interior was purged with nitrogen gas, the reactor was charged with 200 g of polytetramethylene glycol (trade name PolyTHF 1000 by BASF Japan, Ltd., Mn 1,000, hydroxyl value 113 mg KOH/g), 38 g of 1,4-butanediol, and 590.9 g of dimethylformamide (DMF). Heating and stirring was started and continued until the system became uniform, after which 156.0 g of 4,4'-methylenebis(phenylene isocyanate) (MDI) was added thereto at 50° C. The temperature was raised to 80° C. for reaction. The reaction was conducted until the absorption peak at 2,270 cm$^{-1}$ assigned to a free isocyanate group on infrared absorption spectroscopy analysis disappeared. Thereafter, 52.5 g of DMF and 275.2 g of methyl ethyl ketone (MEK) were added, yielding a solution of silicone-free polyurethane resin PU1 having a silicone content of 0%, a number average molecular weight of 75,000, and a solid content of 30%. The results are shown in Table 1.

TABLE 1

| Composition (g) | Synthesis Example 1 SiPU1 | 2 SiPU2 | 3 SiPU3 | 4 SiPU4 | 5 SiPU5 | 6 SiPU6 | 7 SiPU7 | 8 SiPU8 | 9 SiPU9 | 10 SiPU10 | Comparative Synthesis Example 1 PU1 |
|---|---|---|---|---|---|---|---|---|---|---|---|
| PolyTHF 1000 | 200 | 200 | 200 | 200 | 200 | 22.5 | 200 | 150 | 200 | 150 | 200 |
| Compound (1-1), n = 10 | 50 | | | | | | | | | | |
| Compound (1-1), n = 25 | | 48 | | | | | | | | | |
| Compound (1-1), n = 30 | | | 0.5 | 4.5 | 48 | 177.5 | | 50 | 24 | 24 | |
| Compound (1-1), n = 120 | | | | | | | 47 | | | | |
| Compound (3-1), m = 30 | | | | | | | | | 24 | | |
| 1,4-Butanediol | 38 | 38 | 38 | 38 | 38 | 38 | 38 | 38 | 38 | 38 | 38 |
| MDI | 169.6 | 160.6 | 156.0 | 156.3 | 159.7 | 125.1 | 156.9 | | 161.1 | | 156.0 |
| IPDI | | | | | | | | 196.1 | | 193.4 | |
| IPDA | | | | | | | | 50.1 | | 46.8 | |
| Compound (3-2), m = 20 | | | | | | | | | | 24 | |
| DMF | 747.4 | 728.5 | 644.4 | 651.4 | 728.0 | 593.1 | 721.8 | 1,129.8 | 730.3 | 1,111.1 | 643.4 |
| MEK | 320.3 | 312.6 | 276.1 | 279.2 | 312.0 | 254.2 | 309.3 | | 313.0 | | 275.2 |
| Solid content (%) | 30 | 30 | 30 | 30 | 30 | 30 | 30 | 30 | 30 | 30 | 30 |
| Number average molecular weight (Mn) | 71,000 | 70,000 | 76,000 | 75,000 | 72,000 | 70,000 | 78,000 | 80,000 | 78,000 | 81,000 | 75,000 |
| Si content (%) | 10.9 | 10.7 | 0.13 | 1.1 | 10.8 | 48.9 | 10.6 | 10.3 | 10.7 | 10.1 | 0 |

Example 1: Fibrillization of SiPU1

Figure 2:
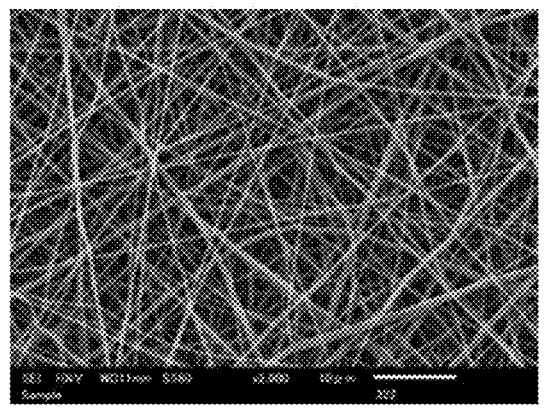
FIG. 2 is a SEM photograph (×2,000) of the surface of a non-woven fabric obtained in Example 1.

In a solvent mixture of 7.7 g of N,N-dimethylformamide and 4.3 g of methyl ethyl ketone, 3.0 g of SiPU1 in Synthesis Example 1 was dissolved. This solution was stirred at room temperature for 24 hours, yielding a uniform milky white solution. Using the apparatus shown in FIG. 1, the polymer solution was discharged on the fibrous structure collecting substrate 4 for 10 hours. The inner diameter of the nozzle 1 was 0.6 mm, the voltage was 20 kV, and the distance from the nozzle 1 to the fibrous structure collecting substrate 4 was 10 cm. The resulting non-woven fabric was measured for a fiber diameter using a scanning electron microscope (SEM) image. The average fiber diameter was 0.93 μm whereas no fibers of 1 μm or more were observed. The SEM image of the non-woven fabric surface is shown in FIG. 2.

Example 2: Fibrillization of SiPU5

Figure 3:
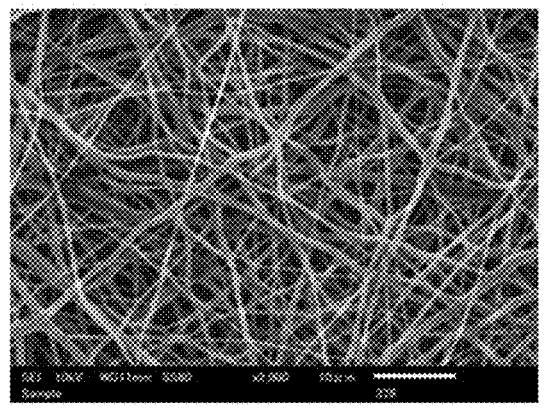
FIG. 3 is a SEM photograph (×2,000) of the surface of a non-woven fabric obtained in Example 2.

Fibrillization was conducted under the same conditions as in Example 1 except that SiPU1 was replaced by SiPU5 in Synthesis Example 5. The resulting non-woven fabric had a fiber diameter of 0.81 μm whereas no fibers of 1 μm or more were observed. The SEM image of the non-woven fabric surface is shown in FIG. 3.

Example 3: Fibrillization of SiPU7

Figure 4:
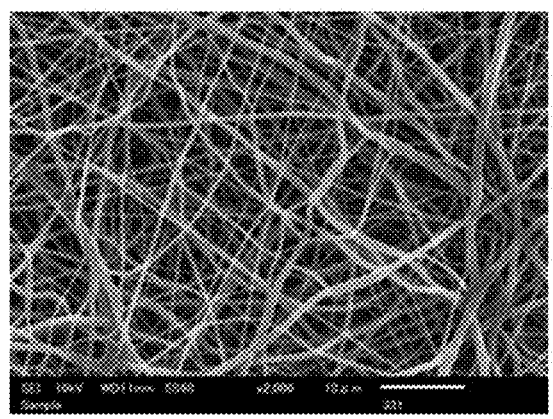
FIG. 4 is a SEM photograph (×2,000) of the surface of a non-woven fabric obtained in Example 3.

Fibrillization was conducted under the same conditions as in Example 1 except that SiPU1 was replaced by SiPU7 in Synthesis Example 7. The resulting non-woven fabric had a fiber diameter of 0.82 μm whereas no fibers of 1 μm or more were observed. The SEM image of the non-woven fabric surface is shown in FIG. 4.

Comparative Example 1: Fibrillization of PU1

Figure 5:
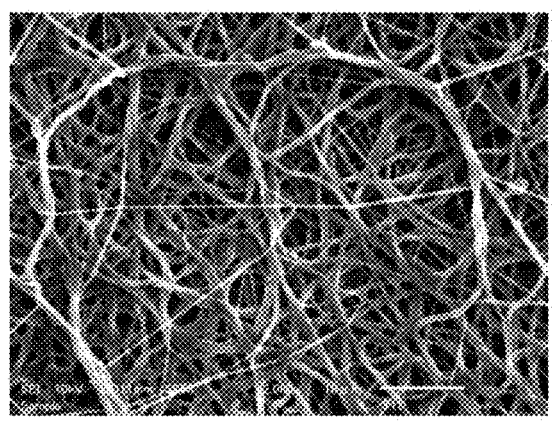
FIG. 5 is a SEM photograph (×2,000) of the surface of a non-woven fabric obtained in Comparative Example 1.

In a solvent mixture of 10.9 g of N,N-dimethylformamide and 6.1 g of methyl ethyl ketone, 3.0 g of PU1 (silicone-free polyurethane resin) in Comparative Synthesis Example 1 was dissolved. The solution was stirred at room temperature for 24 hours, yielding a uniform milky white solution. Using the apparatus shown in FIG. 1, the polymer solution was discharged on the fibrous structure collecting substrate 4 for 10 hours. The inner diameter of the nozzle 1 was 0.6 mm, the voltage was 15 kV, and the distance from the nozzle 1 to the fibrous structure collecting substrate 4 was 10 cm. The resulting non-woven fabric had an average fiber diameter of 0.72 μm whereas no fibers of 1 μm or more were observed. The SEM image of the non-woven fabric surface is shown in FIG. 5.

The non-woven fabrics in Examples and Comparative Example were evaluated for the following properties. The results are shown in Table 2.

<Elastic Modulus>

The elastic modulus was determined from the stress-strain curve which was obtained by cutting the non-woven fabric into a sample of 5 mm wide and 10 mm long and measuring at a pulling rate of 10 mm/min by means of a compact table-top material tester EZ Test/EZ-S(Shimadzu Corp.).

<Elongation at Break>

The elongation at break was determined from the stress-strain curve which was obtained by cutting the non-woven fabric into a sample of 5 mm wide and 10 mm long and measuring at a pulling rate of 10 mm/min by means of a compact table-top material tester EZ Test/EZ-S(Shimadzu Corp.).

<Coefficient of Dynamic Friction>

The coefficient of dynamic friction was determined by a horizontal tensile tester AGS-X (Shimadzu Corp.) under a load of 200 g and moving speed of 0.3 m/min.

Conditions: coefficient of dynamic friction between the non-woven fabric and artificial leather (Supplare®, Idemitsu Techno Fine Co., Ltd.).

<Blocking Resistance>

Non-woven fabrics of the same lot were laid one on another and allowed to stand at 36° C. and 80% RH for 24 hours, after which they were forced to slide each other.

○: No adhesion between non-woven fabrics, smooth sliding

Δ: No adhesion between non-woven fabrics, moderate sliding

X: No adhesion between non-woven fabrics, difficult sliding

<Thermal Conductivity>

The thermal conductivity was measured by a precise and fast thermal property-measuring instrument KES-F7 Thermo Labo IIB (Kato Tech Co., Ltd.).

<Contact Angle with Water>

The static contact angle with pure water was measured by an automatic contact angle meter DM-501Hi (Kyowa Interface Science Co., Ltd.).

<Water Vapor Permeability>

The water vapor permeability was measured by a water vapor permeation analyzer L80-5000 (Systech Instruments Ltd.) under conditions of JIS K7129A at 40° C.

<Moisture Regain>

The non-woven fabric was immersed in water for 24 hours and then dried at 60° C. for 24 hours under conditions of JIS L1096.

Moisture regain (%)=[(weight (g) of sample before drying)−(weight (g) of dry sample)]/(weight (g) of dry sample)×100

<Oxygen Permeability>

The oxygen permeability was measured at 40° C. by a gas permeability analyzer K-315-N(Toyorika Co., Ltd.).

<Spinnability>

The fiber diameter was observed under SEM, and rated as follows.

○: uniform fiber diameter

X: non-uniform fiber diameter

TABLE 2

| Measurement item | Example 1 (Synthesis Example 1) | Example 2 (Synthesis Example 5) | Example 3 (Synthesis Example 7) | Comparative Example 1 (Comparative Synthesis Example 1) |
|---|---|---|---|---|
| Thickness of non-woven fabric (μm) | 76 | 60 | 102 | 117 |
| Elastic modulus (MPa) | 6.6 | 7.4 | 8.2 | 2.8 |
| Elongation at break (%) | 142 | 108 | 104 | 166 |
| Coefficient of dynamic friction | 1.33 | 0.95 | 1.00* | 1.95* |
| Blocking resistance | ○ | ○ | ○ | X |
| Thermal conductivity (W/mK) | 0.012 | 0.013 | 0.014 | 0.012 |
| Water vapor permeability (ml/m² · day) | 1,000< | 1,000< | 1,000< | 1,000< |
| Contact angle with water (°) | 133 | 133 | 131 | 117 |
| Moisture regain (%) | 164 | 175 | 190 | 292 |
| Oxygen permeability (ml/m² · day) | 1,000< | 1,000< | 1,000< | 1,000< |
| Spinnability | ○ | ○ | ○ | X |

*The value is just for reference because a stick-slip phenomenon occurred.

INDUSTRIAL APPLICABILITY

The invention is successful in providing a fiber having excellent properties including flexibility, slippage, blocking resistance, heat retention, water vapor permeability, water repellency, and spinnability. The fiber contributes to various fields such as apparel, filter, and medical fields.

REFERENCE SIGNS LIST

1 Nozzle
2 Polymer solution
3 Syringe (polymer solution reservoir)
4 Collecting substrate
5 High-voltage supply

The invention claimed is:

1. A fiber formed from a resin comprising a silicone-modified polyurethane resin comprising the reaction product of a polyol (A), a chain extender (B), an active hydrogen-containing organopolysiloxane (C), and a polyisocyanate (D), the active hydrogen-containing organopolysiloxane (C) containing an active hydrogen-containing organopolysiloxane (C-1) having a carbinol group only at one end, wherein the fiber has fiber diameter of less than 1,000 nm, and
the active hydrogen-containing organopolysiloxane (C) further contains an organopolysiloxane (C-2) having the following formula (3):

$$R^8SiR^2R^3O(SiR^2R^3O)_m SiR^2R^3R^8 \quad (3)$$

wherein $R^2$ and $R^3$ are as defined above, $R^8$ is each independently a $C_1$-$C_{10}$ monovalent hydrocarbon which has a hydroxyl or mercapto group and may have an oxygen atom intervening in the chain, or a $C_1$-$C_{10}$ monovalent hydrocarbon group having a primary or secondary amino group, and m is an integer of 1 to 60.

2. The fiber of claim 1 wherein the active hydrogen-containing organopolysiloxane (C-1) having a carbinol group is an organopolysiloxane having the following formula (1):

$$R^1R^2R^3SiO(SiR^2R^3O)_n SiR^2R^3R^4 \quad (1)$$

wherein $R^1$, $R^2$ and $R^3$ are each independently selected from a straight, branched or cyclic $C_1$-$C_{10}$ alkyl group in which some hydrogen may be substituted by fluorine, optionally substituted $C_5$-$C_{12}$ aryl group, and vinyl group, $R^4$ is represented by the following formula (2):

$$-R^5-X-CH_2CR^6(R^7)_2 \quad (2)$$

wherein $R^5$ is a $C_2$-$C_{10}$ divalent alkylene group which may contain an oxygen atom in the chain, $R^6$ is hydrogen, amino or $C_1$-$C_{10}$ monovalent alkyl group, $R^7$ is a $C_1$-$C_{10}$ carbinol group, and X is a single bond or —O— bond, and n is an integer of 1 to 200.

3. The fiber of claim 2 wherein the carbinol group is selected from hydroxymethyl, 2-hydroxyethan-1-yl, 2-hydroxypropan-1-yl, 3-hydroxypropan-1-yl, 2-hydroxybutan-1-yl, 4-hydroxybutan-1-yl, 5-hydroxypentan-1-yl, 6-hydroxyhexan-1-yl, 7-hydroxyheptan-1-yl, 8-hydroxyoctan-1-yl, 9-hydroxynonan-1-yl, and 10-hydroxydecan-1-yl.

4. The fiber of claim 1 wherein a ratio of the organopolysiloxane (C-1) having formula (1) to the organopolysiloxane (C-2) having formula (3), that is, (C-1):(C-2) is from 99:1 to 1:99 as a weight ratio.

5. The fiber of claim 1 wherein component (C) is present in an amount of 0.1 to 50 parts by weight per 100 parts by weight of components (A) to (D) combined.

6. The fiber of claim 1 wherein the silicone-modified polyurethane resin has a number average molecular weight of 10,000 to 200,000.

7. The fiber of claim 1 which has a fiber diameter of 100 nm to less than 1,000 nm.

8. A fiber layup structure comprising the fiber of claim 1.

9. A method for preparing the fiber of claim 1, comprising the step of spinning a fiber from a solution or dispersion of the silicone-modified polyurethane resin by an electrospinning method.

10. The method for preparing the fiber of claim 9 wherein the silicone-modified polyurethane resin is fed in the form of a solution or dispersion in an organic solvent, water or a mixture thereof.

11. A fiber formed from a resin comprising a silicone-modified polyurethane resin comprising the reaction product of a polyol (A), a chain extender (B), an active hydrogen-containing organopolysiloxane (C), and a polyisocyanate (D), the active hydrogen-containing organopolysiloxane (C) containing an active hydrogen-containing organopolysiloxane (C-1) having a carbinol group only at one end and an organopolysiloxane (C-2) having the following formula (3):

$$R^8SiR^2R^3O(SiR^2R^3O)_mSiR^2R^3R^8 \tag{3}$$

wherein $R^2$ and $R^3$ are as defined above, $R^8$ is each independently a $C_1$-$C_{10}$ monovalent hydrocarbon which has a hydroxyl or mercapto group and may have an oxygen atom intervening in the chain, or a $C_1$-$C_{10}$ monovalent hydrocarbon group having a primary or secondary amino group, and m is an integer of 1 to 60.

12. The fiber of claim 11 wherein a ratio of the organopolysiloxane (C-1) having formula (1) to the organopolysiloxane (C-2) having formula (3), that is, (C-1):(C-2) is from 99:1 to 1:99 as a weight ratio.

* * * * *